US009514323B2

(12) United States Patent
Mehring et al.

(10) Patent No.: US 9,514,323 B2
(45) Date of Patent: Dec. 6, 2016

(54) RFID SYSTEM WITH SEGMENTED RFID DATA OWNERSHIP

(71) Applicant: Intelleflex Corporation, Santa Clara, CA (US)

(72) Inventors: Peter Arnold Mehring, Los Altos, CA (US); Zeljka LeMaster, Santa Clara, CA (US)

(73) Assignee: Intelleflex Corporation, San Jose, CA (US)

( * ) Notice: Subject to any disclaimer, the term of this patent is extended or adjusted under 35 U.S.C. 154(b) by 261 days.

(21) Appl. No.: 14/014,173

(22) Filed: Aug. 29, 2013

(65) Prior Publication Data

US 2014/0075572 A1  Mar. 13, 2014

Related U.S. Application Data

(60) Provisional application No. 61/695,260, filed on Aug. 30, 2012.

(51) Int. Cl.
*G06F 21/62* (2013.01)
*G06K 7/10* (2006.01)
*G06K 19/07* (2006.01)
*G06F 21/10* (2013.01)

(52) U.S. Cl.
CPC ........... *G06F 21/6218* (2013.01); *G06F 21/10* (2013.01); *G06K 7/10366* (2013.01); *G06K 19/0717* (2013.01)

(58) Field of Classification Search
CPC ........ G06F 21/60; G06F 21/604; G06F 21/62; G06F 21/6218; G06F 21/6227; G06F 2221/2151; H04L 63/10; H04L 63/101–63/105; G06K 19/00; G06K 19/0716; G06K 19/0717; G06K 7/10366
See application file for complete search history.

(56) References Cited

U.S. PATENT DOCUMENTS

| | | | | |
|---|---|---|---|---|
| 7,126,470 | B2 * | 10/2006 | Clift et al. | 340/539.13 |
| 7,518,511 | B1 * | 4/2009 | Panja et al. | 340/572.1 |
| 7,639,140 | B2 * | 12/2009 | Shah | 340/572.1 |
| 7,646,300 | B2 | 1/2010 | Stewart et al. | |
| 7,937,298 | B2 * | 5/2011 | Shah | 705/28 |
| 8,004,468 | B2 * | 8/2011 | Al-Mahdawi | 343/700 MS |
| 8,334,775 | B2 * | 12/2012 | Tapp et al. | 340/572.4 |

(Continued)

OTHER PUBLICATIONS

Ilic et al. "Dual Ownership: Access Management for Shared Item Information in RFID-enabled Supply Chains" [Online], Mar. 19-23, 2007 [Retrieved on: Jul. 23, 2016], www.ieee.org, [Retrieved from: <http://ieeexplore.ieee.org/stamp/stamp.jsp?tp= &arnumber=4144853 >].*

*Primary Examiner* — Eric W Shepperd
(74) *Attorney, Agent, or Firm* — Zilka-Kotab, PC

(57) ABSTRACT

A method according to one embodiment includes receiving data from a radio frequency identification (RFID) tag; receiving waypoint information relating to the RFID tag; setting ownerships of discrete portions of the data based at least in part on the waypoint information; allowing an owner of one of the discrete portions of the data to view the discrete portion of the data owned by the owner, or derivative thereof; and not allowing the owner to view discrete portions of the data that are not owned by the owner.

21 Claims, 8 Drawing Sheets

(56) References Cited

U.S. PATENT DOCUMENTS

| | | | | |
|---|---|---|---|---|
| 8,881,240 B1* | 11/2014 | Malik | ................... | G06F 21/604 |
| | | | | 726/4 |
| 2003/0171956 A1* | 9/2003 | Cox | ...................... | G06Q 10/10 |
| | | | | 705/4 |
| 2005/0143133 A1* | 6/2005 | Bridgelall | .............. | H01Q 1/007 |
| | | | | 455/562.1 |
| 2006/0117382 A1* | 6/2006 | Karabulut | ........... | H04L 63/0823 |
| | | | | 726/10 |
| 2006/0132309 A1* | 6/2006 | Posamentier | ........ | G11B 19/122 |
| | | | | 340/572.1 |
| 2007/0215709 A1* | 9/2007 | Baude et al. | ................. | 235/492 |
| 2007/0285229 A1 | 12/2007 | Batra et al. | | |
| 2007/0285238 A1* | 12/2007 | Batra | .......................... | 340/572.1 |
| 2008/0048857 A1* | 2/2008 | Billmaier et al. | ........ | 340/539.26 |
| 2008/0284597 A1* | 11/2008 | Shah | .......................... | 340/572.1 |
| 2008/0288961 A1* | 11/2008 | Shah | ............................ | 719/316 |
| 2009/0115600 A1* | 5/2009 | Lee | ......................... | H04L 63/10 |
| | | | | 340/539.11 |
| 2010/0013599 A1* | 1/2010 | Tartock | ................... | H04Q 9/00 |
| | | | | 340/10.1 |
| 2010/0052908 A1* | 3/2010 | Doan et al. | ................ | 340/572.1 |
| 2010/0102935 A1* | 4/2010 | Chaves et al. | ............. | 340/10.51 |
| 2011/0131664 A1* | 6/2011 | Jonsson | .................. | G06F 21/10 |
| | | | | 726/28 |
| 2011/0140856 A1* | 6/2011 | Downie et al. | .............. | 340/10.1 |
| 2011/0252433 A1* | 10/2011 | Isoyama | ....................... | 719/318 |
| 2012/0242453 A1* | 9/2012 | Delgado et al. | ............ | 340/10.1 |
| 2012/0242481 A1* | 9/2012 | Gernandt | ........... | G06K 19/0705 |
| | | | | 340/539.13 |

* cited by examiner

RFID SYSTEM WITH SEGMENTED RFID DATA OWNERSHIP

RELATED APPLICATIONS

This application claims priority to provisional U.S. patent application Ser. No. 61/695,260 filed Aug. 30, 2012, and which is herein incorporated by reference.

FIELD OF THE INVENTION

The present invention relates to Radio Frequency (RF) systems, and more particularly, this invention relates to securing Radio Frequency Identification (RFID) tag data and controlling access to portions of the tag data, whether residing on the tag or a remote database, based on approved ownership.

BACKGROUND

RFID tags can be used to collect and store a wide range of important data, which the RFID tag owners are able to access, and may wish to share with other users upon approved permission. However, it is not always desirable to openly share the RFID tag data. For example, some of the data may be sensitive, confidential, and/or irrelevant to subsequent users. Presently, RFID tag owners are limited to sharing the RFID tag data either in full or not at all.

BRIEF SUMMARY

A method according to one embodiment includes receiving data from a radio frequency identification (RFID) tag; receiving waypoint information relating to the RFID tag; setting ownerships of discrete portions of the data based at least in part on the waypoint information; allowing an owner of one of the discrete portions of the data to view the discrete portion of the data owned by the owner, or derivative thereof; and not allowing the owner to view discrete portions of the data that are not owned by the owner.

A computer program product according to one embodiment includes executable computer code embodied on a computer readable storage medium. The computer code includes computer code for receiving data from an RFID tag; computer code for receiving waypoint information relating to the RFID tag; computer code for setting ownerships of discrete portions of the data based at least in part on the waypoint information; computer code for allowing an owner of one of the discrete portions of the data to view the discrete portion of the data owned by the owner, or derivative thereof; and computer code for not allowing the owner to view discrete portions of the data that are not owned by the owner.

A method for evaluating performance of an RFID tag according to one embodiment includes receiving data from an RFID tag; receiving waypoint information relating to the RFID tag; segmenting the data into discrete portions using the waypoint information; detecting similarities and/or anomalies in the data across the discrete portions of the data; and outputting the detected similarities and/or anomalies, or derivative thereof.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of RFID-based systems and/or related systems and methods, as well as operation and/or component parts thereof.

In one general embodiment, a method includes receiving data from a radio frequency identification (RFID) tag; receiving waypoint information relating to the RFID tag; setting ownerships of discrete portions of the data based at least in part on the waypoint information; allowing an owner of one of the discrete portions of the data to view the discrete portion of the data owned by the owner, or derivative thereof; and not allowing the owner to view discrete portions of the data that are not owned by the owner.

In another general embodiment, a computer program product includes executable computer code embodied on a computer readable storage medium. The computer code includes computer code for receiving data from an RFID tag; computer code for receiving waypoint information relating to the RFID tag; computer code for setting ownerships of discrete portions of the data based at least in part on the waypoint information; computer code for allowing an owner of one of the discrete portions of the data to view the discrete portion of the data owned by the owner, or derivative thereof; and computer code for not allowing the owner to view discrete portions of the data that are not owned by the owner.

In yet another embodiment, a method for evaluating performance of an RFID tag includes receiving data from an RFID tag; receiving waypoint information relating to the RFID tag; segmenting the data into discrete portions using the waypoint information; detecting similarities and/or anomalies in the data across the discrete portions of the data; and outputting the detected similarities and/or anomalies, or derivative thereof.

Figure 1:
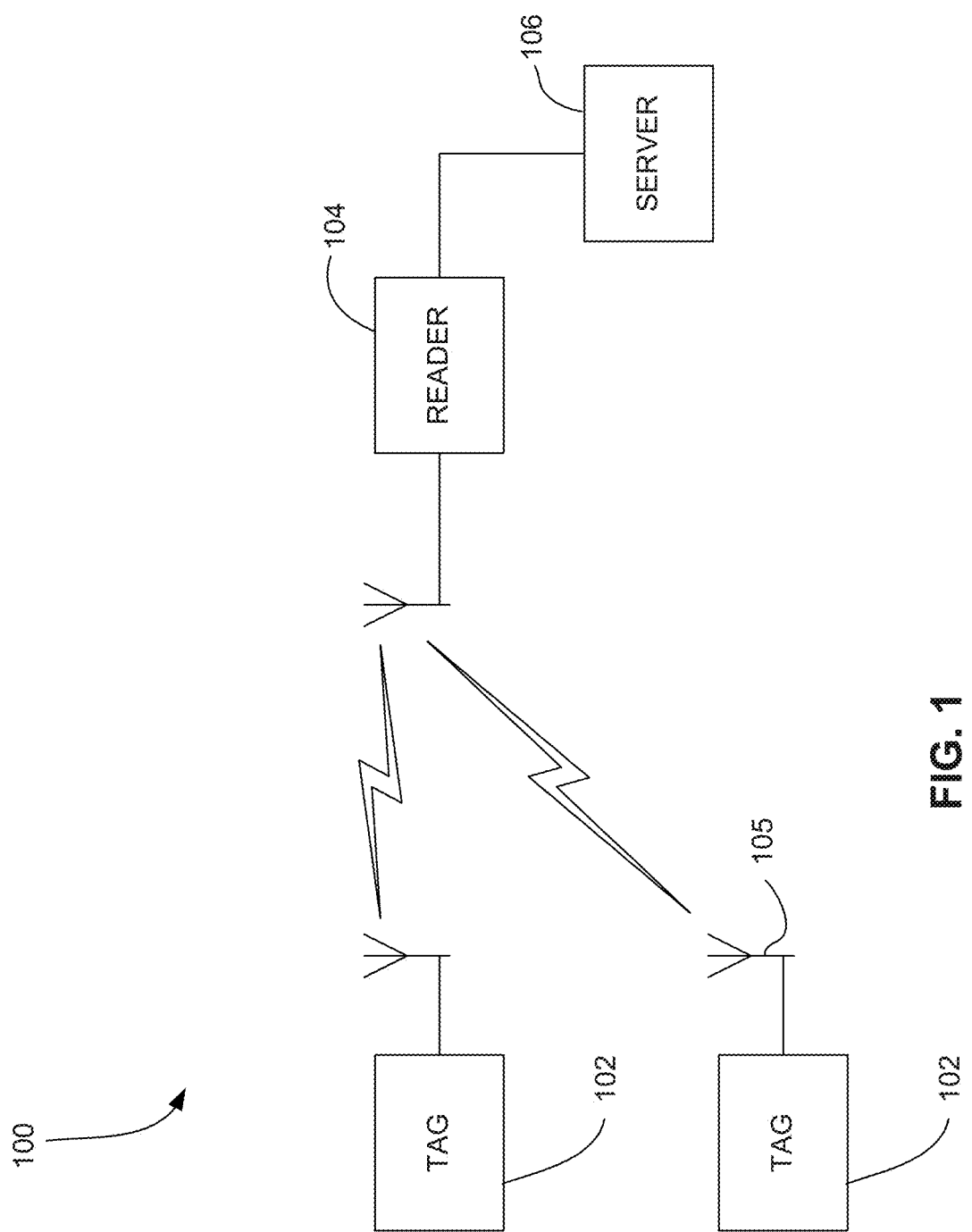
FIG. 1 is a system diagram of an RFID system according to one embodiment.

FIG. 1 depicts an RFID system 100 according to one of the various embodiments, which may include some or all of the following components and/or other components. As shown in FIG. 1, one or more RFID devices 102 are present. Each RFID device 102 in this embodiment includes a controller and memory, which are preferably embodied on a single chip as described below, but may also or alternatively include a different type of controller, such as an application specific integrated circuit (ASIC), processor, an external memory module, etc. For purposes of the present discussion, the RFID devices 102 will be described as including a chip. Each RFID device 102 may further include or be coupled to an antenna 105.

An illustrative chip is disclosed below, though actual implementations may vary depending on how the device is to be used. In general terms, a preferred chip includes one or more of a power supply circuit to extract and regulate power from the RF reader signal; a detector to decode signals from the reader; a backscatter modulator and/or transmitter to send data back to the reader; anti-collision protocol circuits; and at least enough memory to store its unique identification code, e.g., Electronic Product Code (EPC).

While RFID devices 102 according to some embodiments are functional RFID tags, other types of RFID devices 102 include merely a controller with on-board memory, a controller and external memory, etc.

Each of the RFID devices 102 may be coupled to an object or item, such as an article of manufacture, a container, a device, a person, etc.

With continued reference to FIG. 1, a remote device 104 such as an interrogator or "reader" communicates with the RFID devices 102 via an air interface, preferably using standard RFID protocols. An "air interface" refers to any type of wireless communications mechanism, such as the radio-frequency signal between the RFID device and the remote device. The RFID device 102 executes the computer commands that the RFID device 102 receives from the reader 104.

The system 100 may also include an optional backend system such as a server 106, which may include databases containing information and/or instructions relating to RFID tags and/or tagged items.

As noted above, each RFID device 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged. Additional fields may also be used as part of the EPC in order to properly encode and decode information from different numbering systems into their native (human-readable) forms.

Each RFID device 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID device 102 to the remote device 104, e.g., reader. Since passive (Class-1 and Class-2) tags get all of their power from the reader signal, the tags are only powered when in the beam of the reader 104.

The Auto ID Center EPC-Compliant tag classes are set forth below:

Class-1
  Identity tags (RF user programmable, range ~3 m)
  Lowest cost
Class-2
  Memory tags (20 bit address space programmable at ~3 m range)
  Security & privacy protection
  Low cost
Class-3
  Semi-passive tags (also called semi-active tags and battery assisted passive (BAP) tags)
  Battery tags (256 bits to 2M words)
  Self-Powered Backscatter (internal clock, sensor interface support)
  ~100 meter range
  Moderate cost
Class-4
  Active tags
  Active transmission (permits tag-speaks-first operating modes)
  ~300 to ~1,000 meter range
  Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. For example, Class-3 tags may only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 to 10 meters. Note that semi-passive and active tags with built in passive mode may also operate in passive mode, using only energy captured from an incoming RF signal to operate and respond, at a shorter distance equivalent to Class-1 tag performance.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

A basic RFID communication between an RFID device and a remote device typically begins with the remote device, e.g., reader, sending out signals via radio wave to find a particular RFID device, e.g., tag via singulation or any other method known in the art. The radio wave hits the RFID device, and the RFID device recognizes the remote device's signal and may respond thereto, Such response may include exiting a hibernation state, sending a reply, storing data, etc.

Figure 2:
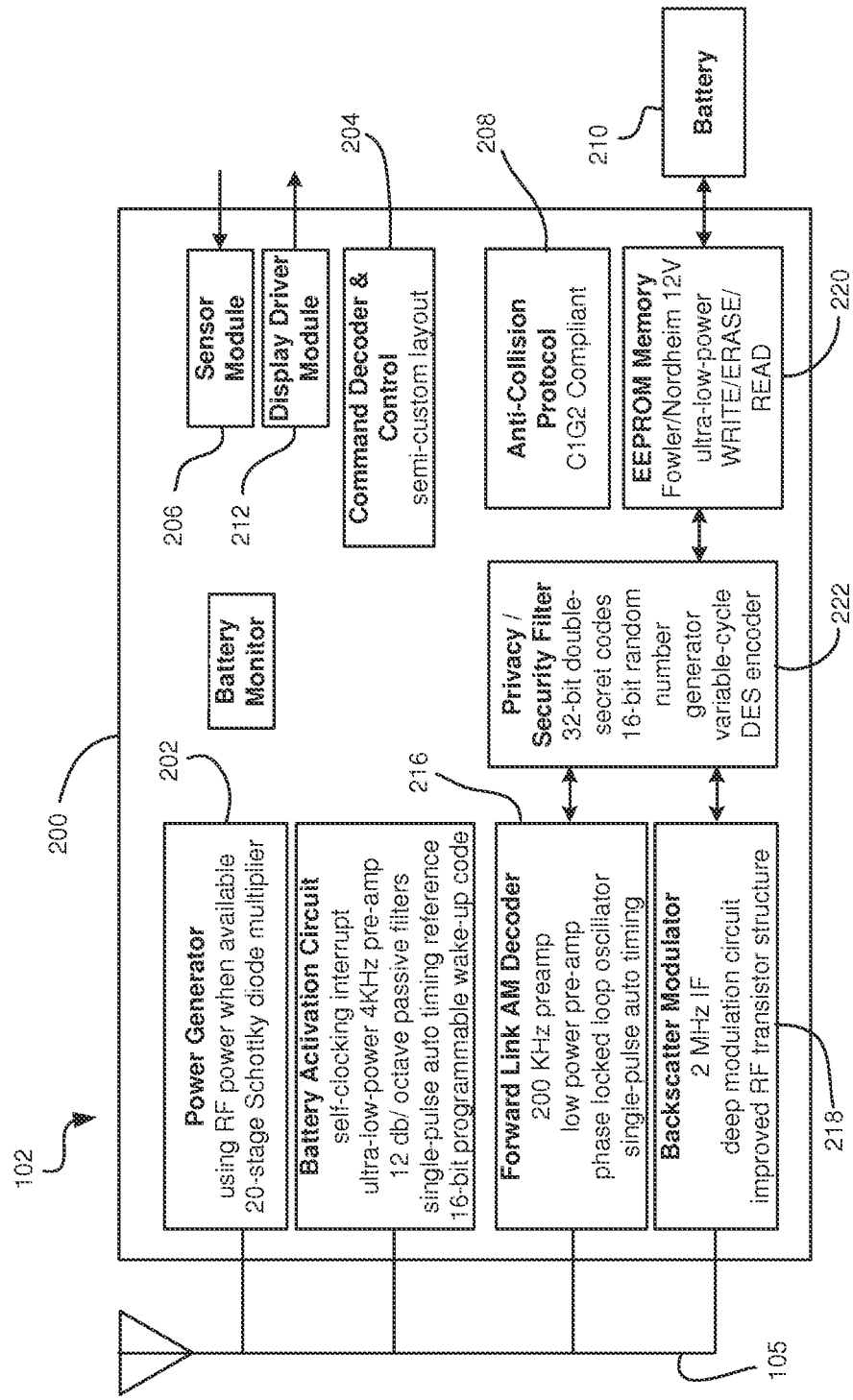
FIG. 2 is a system diagram for an integrated circuit (IC) chip for implementation in an RFID device according to one embodiment.

Embodiments of the RFID device are preferably implemented in conjunction with a Class-3 or higher Class IC chip, which typically contains the processing and control circuitry for most if not all tag operations. FIG. 2 depicts a circuit layout of a Class-3 IC 200 and the various control circuitry according to an illustrative embodiment for implementation in an RFID tag 102. It should be kept in mind that the present invention can be implemented using any type of RFID device, and the circuit 200 is presented as only one possible implementation.

The Class-3 IC of FIG. 2 can form the core of RFID chips appropriate for many applications such as identification of pallets, cartons, containers, vehicles, or anything where a range of more than 2-3 meters is desired, or they operate in a difficult RF environment. As shown, the chip 200 includes several circuits including a power generation and regulation circuit 202, a digital command decoder and control circuit 204, a sensor interface module 206, a C1G2 interface protocol circuit 208, and a power source (battery) 210. A display driver module 212 can be added to drive a display.

The RFID device may have a dedicated power supply, e.g. battery; may draw power from a power source of the electronic device (e.g., battery, AC adapter, etc.); or both. Further, the RFID device may include a supplemental power source. Note that while the present description refers to a "supplemental" power source, the supplemental power source may indeed be the sole device that captures energy from outside the tag, be it from solar, RF, kinetic, etc. energy, A forward link AM decoder 216 uses a simplified phase-lock-loop oscillator that requires only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 220 is present to reduce both the WRITE and ERASE currents to about 2 µA/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

The module 200 may also incorporate a security encryption circuit 222 for operating under one or more security schemes, secret handshakes with readers, etc.

As alluded to above, tag data may be stored in memory on an RFID tag. RFID tag data can be any type of data, including sensor data which may include timestamps, origination and destination data, waypoint data, ownership data, data about the item to which affixed such as product contents, etc. The tag itself may have an "owner", where "ownership" may refer to outright physical ownership, as well as a level of control over the tag and/or its use, data, etc. Similarly, ownership can be defined for the tag data, including discrete portions thereof such that each portion may be owned by a different entity. Such "ownership" may refer broadly to some association of a user or entity ("owner") with a discrete portion of the data, as will soon become apparent.

In preferred embodiments, RFID tag data and/or a portion thereof may preferably remain secure to the owner of the tag such that unauthorized access to the tag data is prevented according to one approach. Moreover, it may be desirable to control access to portions of the RFID tag data upon approved changes to ownership, particularly in the case where a single RFID tag may change ownership at least once e.g., when traversing a supply chain. Upon determining an approved ownership of the RFID tag, an owner may be granted access to at least a portion of the RFID tag data associated with that owner. According to a preferred approach, the tag data may be uploaded and stored on a cloud-based data management system along with ownership information, which may be assigned in the field and written to the tag. The owner of a portion of the data may then be provided access to the data via a computer interface, mobile application on a handheld device, etc. By cloud-based, what is meant is that the data management system is accessible from at least two different remote locations via a network.

According to a preferred approach, ownership designation of the RFID tag data within a cloud-based data management system may mirror its particular ownership segmentation. Thereby the tag data may preferably be segmented by various factors, while additionally maintaining the complete tag data history (explained in further detail below). This may be desirable for applications such as produce delivery or package delivery because the complete shipping history allows for traceability, transfer of ownership information, as well as a complete product timeline.

Figure 3:
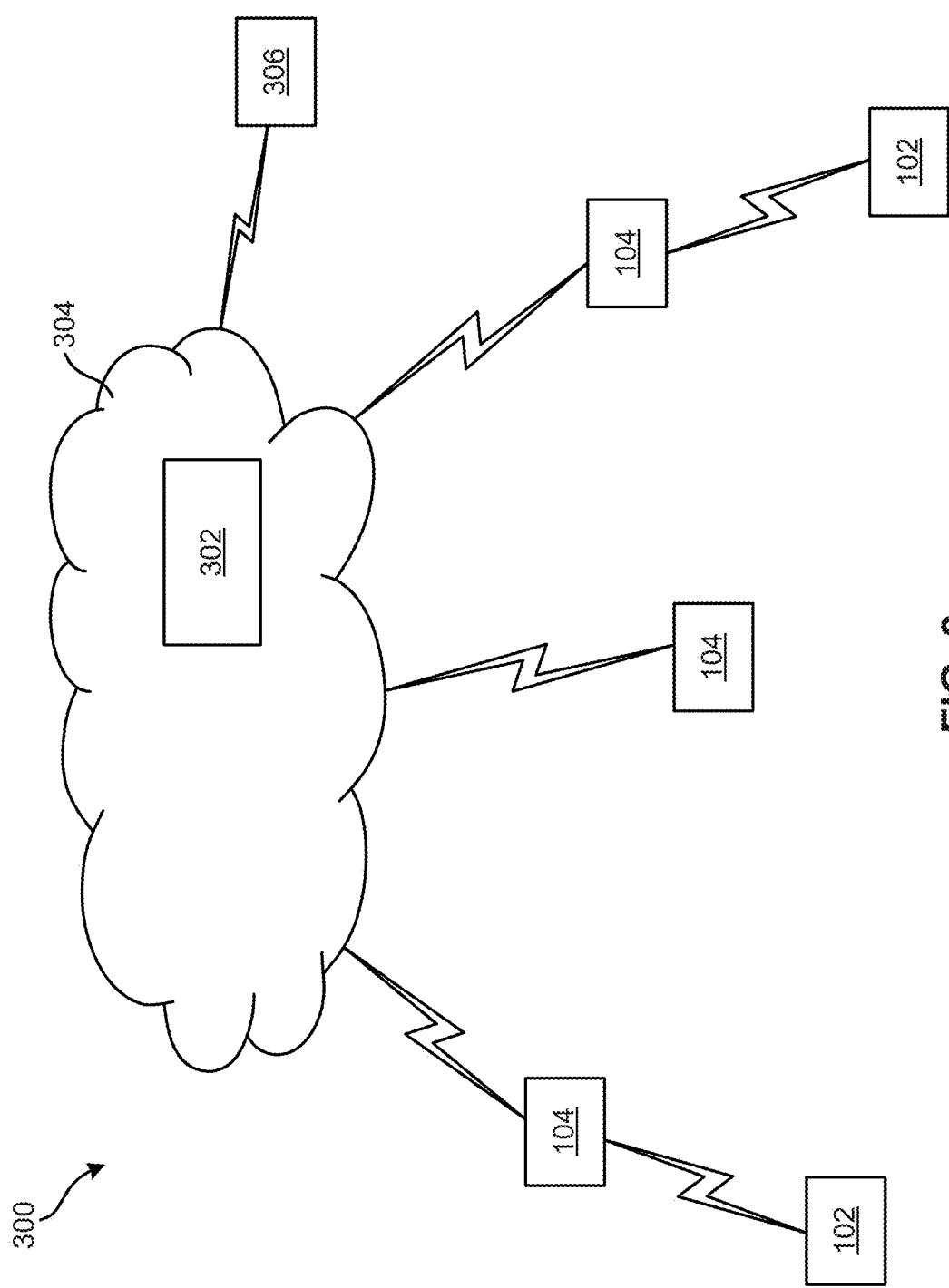
FIG. 3 is a high level representation of a system architecture according to one embodiment.

FIG. 3 illustrates a high level system architecture 300 that includes a cloud-based data management system that has a data management module 302 for storing and controlling access to RFID tag data. As used herein, the cloud-based data management system may include components from the ZEST™ system and/or service, available from Intelleflex Corporation, 2465 Augustine Drive #102, Santa Clara, Calif. 95054, USA, As an option, the present system 300 may be implemented in conjunction with features from any other embodiment listed herein, such as those described with reference to the other FIGS. Of course, however, components of such architecture 300 and others presented herein may be used in various applications and/or in permutations which may or may not be specifically described in the illustrative embodiments listed herein. Further, various components of the architecture 300 presented herein may be used in any desired environment.

As shown, the architecture 300 includes a data management module 302 residing in a "data cloud" 304, either of which may include one or more computing devices, one or more databases, one or more storage devices, one or more networking devices, etc. RFID readers 104 are in communication with the data management module 302 and/or cloud 300 via any type of known connection, including the internet, mobile telephony network, etc. The RFID readers 104 may communicate with one or more RFID tags 102 to read and/or write tag data and/or other data. Tag data received by an RFID reader 104 may be transmitted to the data management module 302 directly as shown, or indirectly through one or more computers, routers, switches, networks, etc., which, as described in detail below, may store and control access to such data, Upon receiving a request from an authorized user or owner, portions (or all) of the tag data may be transmitted to a user device 306. Note that the foregoing architecture 300 is exemplary only, and those skilled in the art will appreciate the many permutations included in the present disclosure.

With continued reference to FIG. 3, in one approach, the RFID tag data may be sent exclusively to the cloud-based data management system through which ownership may be verified and appropriate access to the data may be made (e.g., via an internet connection).

As will soon become apparent, regarding a new RFID tag, or a tag being re-used, an owner may create a connection between the data management module 302 and the new RFID tag by incorporating an RFID tag reader, by scanning a bar code on the RFID tag using a bar code scanner coupled to a computer in communication with the data management module 302, by entering an ID of the tag into an interface with the data management module 302, etc. Moreover, any corresponding product association may also be provided.

In one illustrative application, RFID tag data may be sent to the cloud-based data management system upon reaching a first waypoint according to any approach described and/or suggested herein. According to various approaches, subsequent RFID tag data may be sent to the cloud-based data management system at time intervals, when subsequent waypoints are reached, when requested by an owner, etc. According to other approaches, the RFID tag data sent to the cloud-based data management system may include product information, the distributer, any of the sensor data listed above, timestamps, etc. In another approach, to further secure the RFID tag data, RFID tags no longer in use may be physically erased, and the tag data associated therewith deleted from the cloud-based data management system, archived, transferred to the owner, etc.

Figure 5:
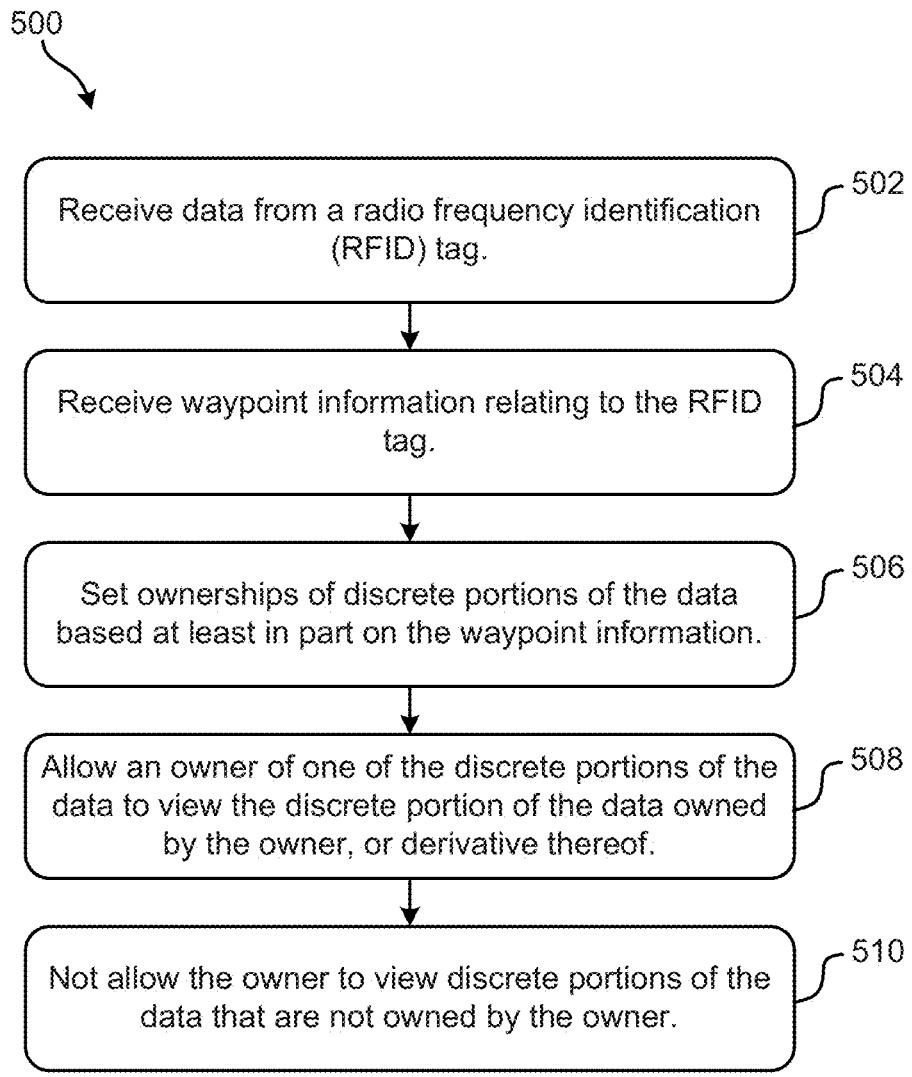
FIG. 5 is a flowchart showing the process steps of a method according to one embodiment.

Referring now to FIG. 5, a method 500 for controlling user access to RFID tag data is illustrated according to an exemplary embodiment. As an option, the present method 500 may be implemented in conjunction with features from any other embodiment listed herein, such as those described with reference to the other FIGS. Of course, however, such method 500 and others presented herein may be used in various applications and/or in permutations which may or may not be specifically described in the illustrative embodiments listed herein. Further, the method 500 presented herein may be used in any desired environment.

The method 500 includes receiving data from a radio frequency identification (RFID) tag. See operation 502. In one approach, the data may be received by an RFID tag reader, which may have retrieved the data from an RFID tag, and then transmitted the tag data to the data management module e.g., via a network.

According to a preferred approach, the tag "data" may include sensor data collected by the RFID tag. In a preferred approach, the RFID tag sensor may detect any number of environmental conditions and/or conditions of an object to which the sensor is attached or proximate to. According to various approaches, the sensor data may include, but is not limited to humidity, Ph, temperature, shock and vibration forces, sunlight, ultraviolet light, chemicals, radioactivity, pathogens, presence of bacteria, presence of viruses, presence of prions, carbon dioxide level, etc. or any other data which would be desired and/or apparent to one skilled in the art upon reading the present description. Additional data may also be stored on the tag and/or uploaded to the data management module, such as timestamps, positioning data (e.g., GPS, reader position information), etc.

According to an exemplary embodiment, the data may further include an association of the RFID tag and a product to which the RFID tag may be directly or indirectly coupled. For example, such data may include an identification of the product, a quantity of the products, a destination of the product, etc. Moreover, the data received from the RFID tag may include unique product information regarding the product that the RFID tag may be directly or indirectly coupled to.

In one approach, the data collected by an RFID tag may be stored in a memory, which may include, but is not limited to Electrically Erasable Programmable Read-Only Memory (EEPROM), Static Random-Access Memory (SRAM), Ferroelectric Random-Access Memory (FRAM), etc.

In various approaches, the memory may be located in the RFID tag, electrically coupled to the RFID tag, in an RFID tag reader, electrically coupled to an RFID tag reader, in a cloud-based data management system, etc. It should be noted that "electrically coupled" in light of the present description preferably includes an electrical connection via a wire, a cable, wirelessly, etc.

Method 500 additionally includes receiving waypoint information relating to the RFID tag. See operation 504. Furthermore, operation 506 includes setting ownerships of discrete portions of the data based at least in part on the waypoint information. Moreover, the RFID tag data may also preferably incorporate information such as time stamps, location information, ownership information, etc. in conjunction with the waypoint criteria, thereby allowing for more detailed information regarding the discreet portions of the data. In light of the present description, "waypoint information" is preferably deemed to include all meanings expressly and impliedly set forth herein, including information based on one or more of a location, a specific time, an event, a change in condition, a change in custody, a spike or anomaly in the data, etc. Exemplary embodiments incorporating waypoint information are provided below.

According to various approaches, an owner may be granted access to all, none, or selected portions of the data (e.g., data corresponding to that data collected between two points, from a point backwards, from a point forward, etc). As described above, the extent of a user's access may be determined by establishing the nature of a user's ownership, at least in part, by incorporating waypoint information.

According to various approaches, at least some of the waypoint information may include information about: a location of the RFID tag, reaching a destination, an event taking place (e.g., entering a password, scanning a barcode, inputting a signature, etc.), a change in custody of the RFID tag, time, an access to the RFID tag by an RFID reader, writing data to the RFID tag, a change in sensor data collected by the RFID tag (e.g., a spike), etc. or any other factors which would be apparent to one skilled in the art upon reading the present description.

In further approaches, at least some of the waypoint information is based on a manual interaction with the RFID tag, where a manual interaction may refer to an interaction with the RFID tag that is not RF-based. For example, a waypoint may be created by pressing a button, touching a screen, etc. (or equivalent manual interaction) on the tag, as it will record the manual interaction (e.g., button press) and time thereof as a waypoint event. Moreover, additional information may be stored in response to the manual interaction, such as any of the information listed in the previous paragraph.

In a preferred approach, once certain waypoint criteria are satisfied and ownership is granted and/or transferred, the data may be segmented into a new discreet portion. In one particular approach, an RFID tag reader may include waypoints to the RFID data, thereby forming discreet portions within the data.

Figure 4:
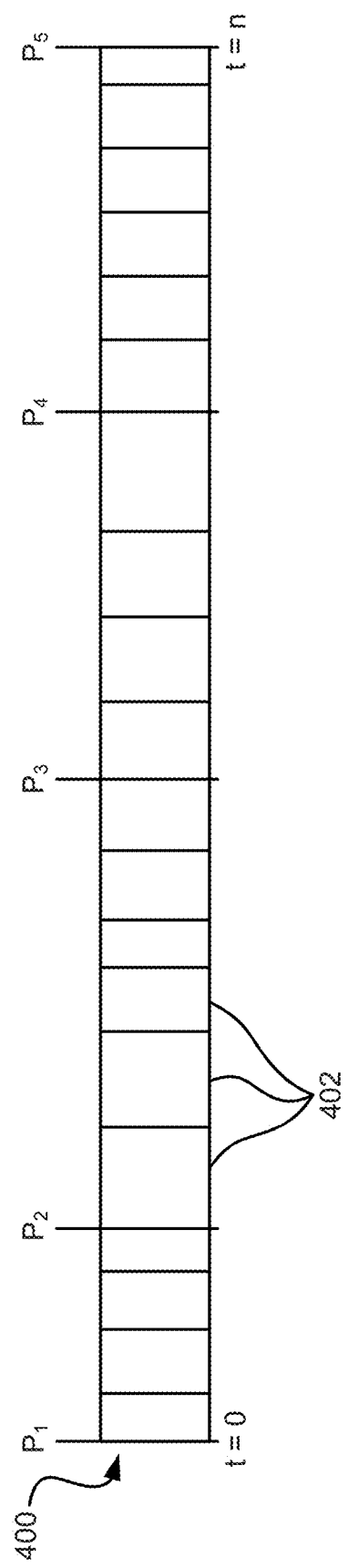
FIG. 4 is a representation of partitioned RFID tag data according to one embodiment.

Referring now to FIG. 4, a representation 400 of partitioned RFID tag data as stored in a data management module is illustrated according to a preferred embodiment. As shown, RFID tag data may be recorded in logs 402 which may be partitioned in correspondence to data size, periods of time, owner inputs, changes in the data being recorded, etc. Moreover, as time progresses from start t=0 to a time t=n, the data 400 may be segmented into discreet portions bounded by partitions $P_1$, $P_2$, $P_3$, $P_4$ and $P_5$. As depicted, the partitions $P_{1-5}$ may preferably correspond to the change in or validation of new ownerships. Thus, according to a preferred approach, the discrete portions bounded by partitions $P_{1-5}$ may preferably correspond to individual ownerships, but may incorporate any approach described and/or suggested herein.

Thereby, in one approach, a single RFID tag may preferably be used and/or reused for multiple ownerships (e.g., jobs, applications, etc.) while maintaining secure access to all data previously collected by the single RFID tag. However, in another approach, when ownership is granted and/or transferred to a new owner, the previous ownership(s) may expire depending on a number of factors.

In one embodiment, once an ownership is established by any one and/or combination of the approaches listed herein, the duration for which the ownership is valid may be determined by a variety of additional factors and/or the factors used to determine the ownership. Thus, according to various approaches, an ownership, once established, may be valid for a period of time, while certain conditions are met, indefinitely, etc.

As stated immediately above, in one embodiment, an ownership may be valid for a period of time. According to various approaches, at the end of the period of time, the ownership may be reevaluated, automatically expire, be automatically renewed, etc. In another embodiment, an ownership may be valid while certain waypoint information standards are met. Again, once certain waypoint information standards are no longer met, the ownership may be reevaluated, automatically expire, initiate a timer upon completion of which the ownership expires, etc.

In another approach, a limit may be placed on a number of owners. When a limit of owners is reached (e.g., one, two, three, four, etc.) for overlapping and/or the same portions of the data, one, some, or all of the ownerships may be reevaluated, automatically expire, initiate a timer, etc. According to various approaches, the ownerships may be reevaluated, automatically expire, initiate a timer, etc. in a first in first out (FIFO), first in last out (FILO), last in first out (LIFO), last in last out (LILO), etc. manner, or any other manner which would be apparent to one skilled in the art upon reading the present description.

According to another embodiment, multiple users may be granted ownership of overlapping and/or the same discreet portions of the data. Thus, in one approach, one entity may be granted ownership of a first portion of data, and a second entity may be granted ownership of the first portion of data as well as a second portion of data.

In another approach, multiple users may be granted ownership of unique discreet portions of the data. Thus, each owner may be restricted to a different discreet portion of the data such that preferably none of the discreet portions overlap and/or share any RFID tag data. In one approach, the multiple users may have ownership of their respective discreet portions at the same or different times. In one approach, an ownership may be defined temporally from a change in custody to the owner to a subsequent change in custody from the owner.

As an example, a truck driver may gain ownership of an RFID tag and therefore be allowed to view the temperature and bacteria data corresponding to that RFID tag. However, when the package is delivered to a warehouse and the ownership is transferred from the track driver to the warehouse, because the track driver's ownership corresponded to the temperature and bacteria data, the warehouse may not be allowed access to the same data. However, the warehouse owner may be allowed to access data gathered while the package is in its custody at the warehouse, until the ownership changes again.

In another approach, an ownership may be approved to at least one item in a group, but not all of the items in the group. As an example, a truck driver may gain ownership of several items on a pallet which is to be delivered, while he is not granted ownership to the remaining items on the pallet.

According to another embodiment, the original, last, etc. owner(s) may retain full access of a given RFID tag's and/or tags' data in its entirety, e.g., an administrator. In one approach, an administrator may manage at least one, at least some, a majority, all, etc. of the other owners of a particular RFID tag's and/or tags' data. According to various approaches, the administrator may individually define each ownership, may implement a global rule, incorporate logic, etc.

According to one approach, the full data ownership may be valid for the entire life of the RFID tag and/or tags. In an example, a car rental company may retain ownership and full access to the entirety of the RFID tags and RFID tag data for each of the cars the company rents. Although the RFID tag corresponding to each of the rental cars may store a new discreet portion in the RFID tag data for each new rental (e.g., waypoint), the rental company may serve as an administrator, thereby retaining access to RFID tag data from each rental, regardless of the segmentation.

In another approach, an owner may be allowed to manually alter at least some of the other ownerships of the discrete portions of the data. In a preferred approach, at least some of the ownerships may be altered to preferably determine the most effective method for a given situation. In one approach, an owner may include an administrative owner who may have access to a majority or all of the RFID tag data. For example, a shipping warehouse manager may be an administrative owner, thereby having access to the RFID tag data of all the packages in the warehouse to be delivered. The shipping warehouse manager may be able to decide the most efficient method of delivery for any given package based on the required delivery date, delivery parameters, destination, etc.

In a preferred approach, which is in no way intended to limit the invention, an owner may only be allowed to view a summary of the discrete portion of the data pertaining to the owner, but not have erasure and/or amendment privileges. Thus an owner may not be allowed to alter the collected data, sensor settings, RFID tag settings, RFID tag reader settings, etc., thereby ensuring authenticity of the data.

With continued reference to method 500 of FIG. 5, operation 508 includes allowing an owner of one of the discrete portions of the data to view the discrete portion of the data owned by the owner, or derivative thereof. In a preferred approach, user access to viewing at least a portion of the data may be granted once ownership has been established. The data may be provided from a remote data management system to the owner via a web-based interface such as one using an internet browser, a proprietary interface, etc. In one approach, a user may be able to view a public or non-sensitive portion of the data and/or device while the user's ownership status is active or pending.

In one approach, a single RFID tag may change ownership any number of times along a supply chain, where each owner may be granted access to a different discrete portion of the tag data. According to various approaches, a discrete portion of the data may include a summary, statistics, only portions of the raw data, etc. or any other discrete portion of the data which would be apparent to one skilled in the art upon reading the present description.

In one approach, an RFID tag reader may process some or all of the data collected by an RFID tag. According to various approaches, the RFID tag reader may order the RFID tag data to be delivered directly to a user e.g., via an email, a printed list, etc.; uploaded to a cloud-based data management system; accessible to an owner e.g., as a summary, the raw data, a representational graph, etc.; etc. Thus, in one particular approach, a summary of the information pertinent to a particular owner may be provided thereto by accessing the cloud-based data management system.

According to various approaches, a summary of RFID tag data may be compiled into a graph, a chart, a table, a list, etc., and may be further combined with other data whether for other RIFD tags or independent data. In one example, the summary of RFID tag data may incorporate a table which may include one, some, or all of an event time, the last temperature, the last temperature log time, number of extreme high alarms, the number of extreme low alarms, the number of high alarms, the number of low alarms, the number of temperature logs, the number of wave point logs, RSSI state, etc. In a further approach, if an owner has the approved ability, they may select one, some or all of the summary topics for a more detailed inspection of the corresponding raw tag data.

According to yet another approach, the RFID tag data may incorporate thresholds (e.g., high, low, specific values, etc.). In one approach, portions of the RFID tag data may be evaluated (e.g., mathematically on the cloud-based data management system), thereby forming summaries e.g., quality factor, average, median, standard deviation, effective life of a product, etc. In varying approaches, RFID data summaries may be compared to the aforementioned thresholds, stored on the cloud-based data management system, output to an approved owner, etc. In one example, once a produce shipment is delivered to a recipient, the cloud-based data management system may compile the RFID tag data gathered during the delivery process, compare it to one or more threshold, and calculate an approximate shelf life of the produce. This approximated shelf life may be available to the recipient by any approach described and/or suggested herein, whereby the recipient may be able to accept or reject the delivery based on the approximated shelf life and/or other factors.

In a preferred approach, the RFID tag may be password protected or incorporate some other type of security to ensure the data collected by the tag is not accessible to unauthorized readers attempting to gain access to the physical RFID tag. Thus in one approach, if a connection is made to a given RFID tag (e.g., wirelessly, using a cable, etc.), ownership verification may preferably be required at the RFID tag by entering a password, scanning a fingerprint, etc. In one example, a truck driver may use a hand held electronic device to scan a barcode of an RFID tag on a given item he is required to deliver. Upon scanning the barcode of the item, he may be prompted to enter a password, whereby ownership is validated and a wireless connection is made to the RFID tag. Thus the truck driver may be granted access to a summary of the given item's recent RFID tag data which may be stored on a memory within the RFID tag, without being provided access to the underlying data. This may enable the truck driver to ensure no thresholds regarding temperature, humidity, presence of bacteria, etc. have been exceeded and therefore the item is in an acceptable condition to be delivered to a customer.

With continued reference to FIG. 5, the method 500 additionally includes not allowing the owner to view discrete portions of the data that are not owned by the owner. See operation 510.

For example, a farmer may oversee the shipping and delivery of his produce to a buyer by incorporating RFID tags. These tags may collect and store data corresponding to the produce's environmental condition during a shipment to a buyer, including, but not limited to temperature and/or presence of bacteria. Moreover, all the data gathered along the supply chain may be accessible to the farmer (e.g., through a connection to a cloud-based data management system, that again, is overseeing the shipping and delivery of his produce, throughout the process. Further illustrative configurations and functionality, which may be implemented into various embodiments, are found in copending U.S. patent application Ser. No. 11/423,695, which is herein incorporated by reference.

According to an illustrative example, a shipping company may receive a package to be delivered to a particular recipient. Upon pickup, a first truck driver may scan a barcode on the package, thereby satisfying a first waypoint and initialize a first ownership. Upon the approval of a first ownership, the RFID data may be segmented into a first discreet portion. As a result, the first truck driver may have access to certain RFID tag data stored on a cloud-based data management system, such as content type, delivery date, priority type, additional instructions, etc. The first truck driver may then deliver the package to a transfer station, whereby the package may be acquired by a second truck driver.

The second truck driver may then enter a package number into a computing device, thereby satisfy a second waypoint and a second ownership is granted to the second truck driver while the first truck driver's ownership is terminated. Thus, the package's RFID tag data may be segmented into a second discreet portion on the cloud-based data management system, and the second truck driver may be granted access thereto. However, the second truck driver's ownership may not allow him to access the RFID tag data of the first discreet portion of the data which corresponds to the first track driver.

Furthermore, upon delivery of the package to the recipient, the recipient may enter a signature into the second truck driver's tablet, thereby satisfying a third waypoint and ownership is granted to the recipient, while the second track driver's ownership is terminated. Thus the recipient may enter the package number into a website prompt and gain full access to the entirety of the RFID tag data collected during the delivery process for reference. However, after a certain time period, the recipient's ownership may expire, thereby creating another segmentation of the data and terminating the recipient's access to the RFID tag data stored on the cloud-based data management system.

According to another example, which is in no way intended to limit the invention, a farmer may oversee the shipping and delivery of his produce to a buyer by incorporating RFID tags with the produce. These tags may collect and store the produce's environmental condition data, including temperature and/or humidity (e.g., among other desired environmental conditions), of which, the entirety of the tag data is accessible to the farmer, even throughout the delivery process. Additionally, a first truck driver from the company hired by the farmer to transport the produce from the farmer to the buyer may be approved as an owner of the RFID tags for at least their portion of the delivery process, e.g., from initially picking up the delivery from the farmer to arriving at one of the transport company's transfer warehouse. As an approved owner of the RFID tags, the first truck driver may be able to manage ideal shipping conditions pre-specified by the farmer, delivery dates, etc. Thereby, the first truck driver's ownership of the RFID tags may terminate upon their delivery to a transfer warehouse, whereby the transfer warehouse may be approved as an owner of the RFID tags while the produce is being processed therein. As an owner of the RFID tags, the transfer warehouse may be able to preferably manage delivery dates, high priority deliveries, time sensitive deliveries (e.g., ripening produce), etc. Moreover, once the farmer's produce is assigned to a second truck driver, the warehouse's ownership of the RFID tags may terminate while the second truck driver may gain ownership of the RFID tags until the produce is delivered to the buyer, whereby the second truck driver's ownership may be terminated as well. As stated above, the farmer may retain ownership of the RFID tags throughout the entirety of the delivery process such that the farmer has detailed data on his produce for reference if needed for future produce shipping, dealings with the buyer, dealings with the shipping company, etc. Again, this example is in no way intended to limit the invention, but rather was included as one possible use for the RFID tags.

Figure 6:
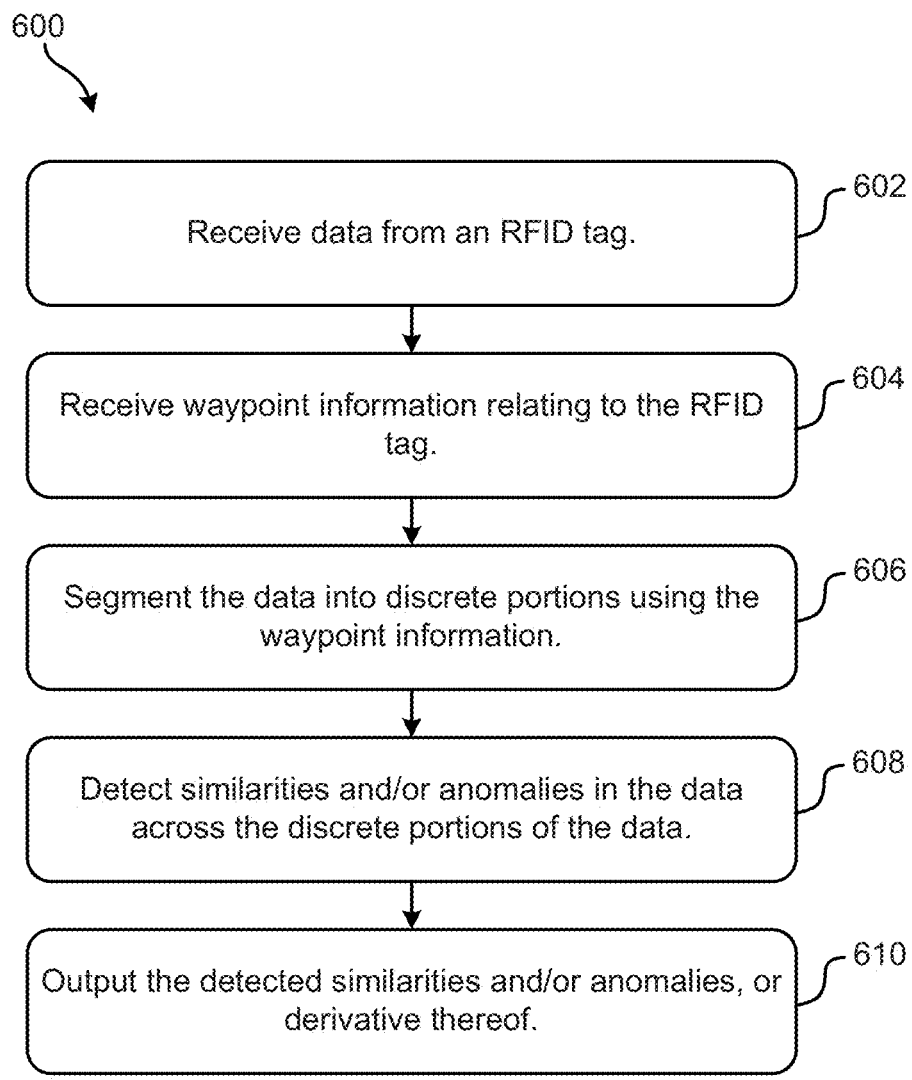
FIG. 6 is a flowchart showing the process steps of a method according to one embodiment.

FIG. 6 depicts a method 600 for evaluating performance of a RFID tag, in accordance with one embodiment. As an option, the present method 600 may be implemented in conjunction with features from any other embodiment listed herein, such as those described with reference to the other FIGS. Of course, however, such method 600 and others presented herein may be used in various applications and/or in permutations which may or may not be specifically described in the illustrative embodiments listed herein. Further, the method 600 presented herein may be used in any desired environment.

Referring now to FIG. 6, a method 600 for evaluating performance of a RFID tag is illustrated according to an illustrative embodiment. The method 600 includes receiving data from an RFID tag. See operation 602. As described above, according to one approach, the data may be received, e.g., at a cloud-based data management system, via a network from a reader that has retrieved the data from the RFID tag, a local computer in communication with the reader, etc. Moreover, according to a preferred approach, the "data" of method 600 may include sensor data collected by the RFID tag according to any approach described and/or suggested herein.

With continued reference to method 600 of FIG. 6, operation 604 includes receiving waypoint information relating to the RFID tag. Furthermore, operation 606 includes segmenting the data into discrete portions using the waypoint information.

The method 600 further includes detecting similarities and/or anomalies in the data across the discrete portions of the data. See operation 608. Method 600 additionally includes outputting the detected similarities and/or anomalies, or derivative thereof. See operation 610.

In one embodiment, similarities in the data across the discrete portions of the data may arise where the discrete portions of the data each posses similar, consistent, or constant, etc. temperatures, humidity, Ph, etc. or other such conditions as described herein. Additionally, in another embodiment, anomalies in the data across the discrete portions of the data may arise where the discrete portions of the data each possess different, inconsistent, fluctuating, changing, outside a predefined range, undesirable, etc. temperatures, humidity, Ph, etc. or other such conditions as described herein. For instance, in one approach, an anomaly may arise where one or more discrete portions of the data exhibit a temperature spike relative to the other discrete portions of data. In another example, an anomaly may arise where one or more discrete portions of the data exhibit an absence of data where a reading should have been taken.

In another approach, data collected from an RFID tag may be checked against a threshold as mentioned above. Should the data fall below a minimum, rise above a maximum, reach a certain value, etc., a cloud-based data management system may send a warning to at least one current owner of the RFID tag who may assess the situation.

According to various approaches, the detected similarities and/or anomalies, or derivative thereof may be output to a user. Moreover, an indication of a problem with the RFID tag based on the detected similarities and/or anomalies may be received (e.g., from a user) and/or output. In various approaches, the detected similarities and/or anomalies, and/or any indication of a problem therewith may be output to a user (e.g., through a graphical user interface (GUI), a display screen, etc.), to memory and/or another process, etc. According to other approaches, detected similarities and/or anomalies, and/or any indication of a problem therewith may be output to a user via textual and/or graphical information, alert information; instructions, audible feedback (e.g., via a speaker which may be coupled to any component to provide audible information), etc. In any of the embodiments, techniques and/or hardware known in the art may be used to implement the various operations.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software miming on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

Figure 7:
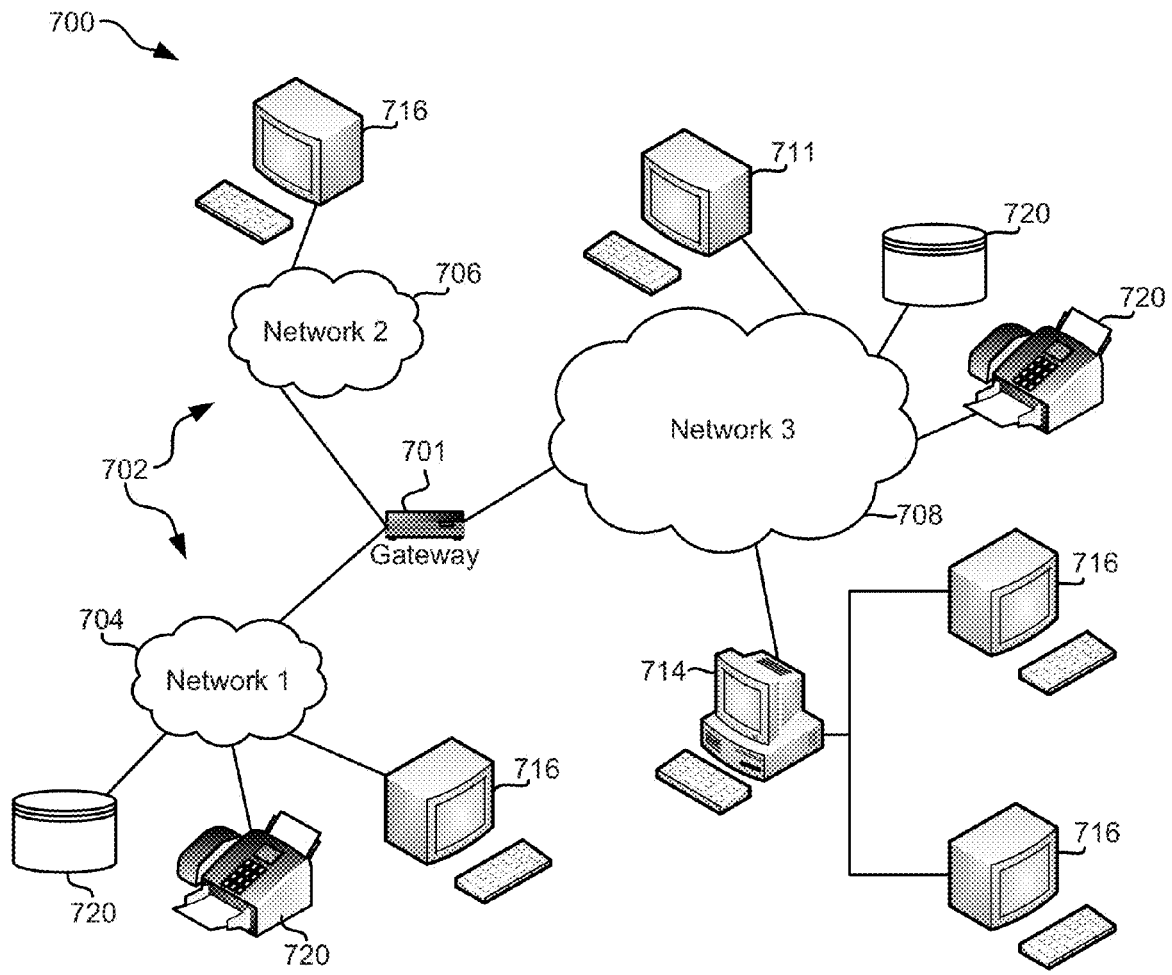
FIG. 7 is a diagram of a network architecture according to one embodiment.

FIG. 7 illustrates a network architecture 700, in accordance with one embodiment. As shown in FIG. 7, a plurality of remote networks 702 are provided including a first remote network 704 and a second remote network 706. A gateway 701 may be coupled between the remote networks 702 and a proximate network 708. In the context of the present network architecture 700, the networks 704, 706 may each take any form including, but not limited to a LAN, a WAN such as the Internet, PSTN, cellular (e.g., GSM), internal telephone network, etc, In use, the gateway 701 serves as an entrance point from the remote networks 702 to the proximate network 708. As such, the gateway 701 may function as a router, which is capable of directing a given packet of data that arrives at the gateway 701, and a switch, which furnishes the actual path in and out of the gateway 701 for a given packet.

Further included is at least one data server 714 coupled to the proximate network 708, and which is accessible from the remote networks 702 via the gateway 701. It should be noted that the data server(s) 714 may include any type of computing device/groupware. Coupled to each data server 714 is a plurality of user devices 716. Such user devices 716 may include a desktop computer, laptop computer, hand-held computer, printer or any other type of logic. It should be noted that a user device 711 may also be directly coupled to any of the networks, in one embodiment.

A peripheral 720 or series of peripherals 720, e.g. facsimile machines, printers, networked storage units, etc., may be coupled to one or more of the networks 704, 706, 708. It should be noted that databases, servers, and/or additional components may be utilized with, or integrated into, any type of network element coupled to the networks 704, 706, 708. In the context of the present description, a network element may refer to any component of a network.

Figure 8:
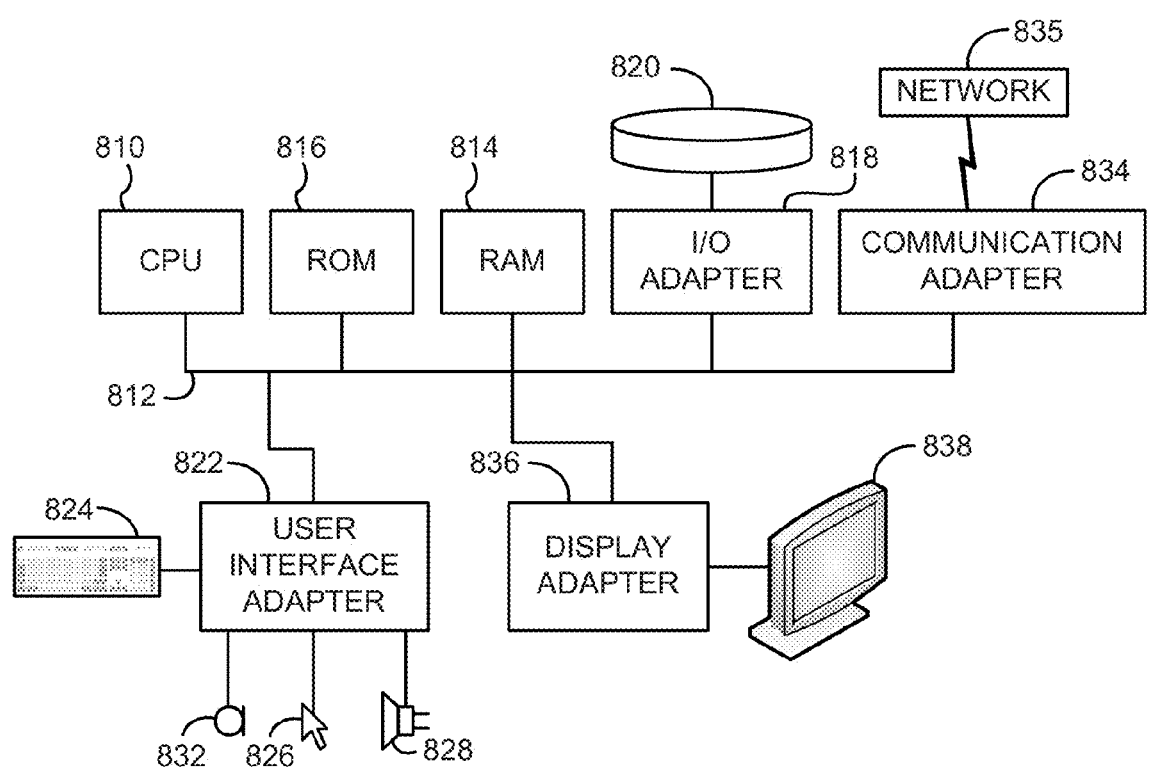
FIG. 8 is a diagram of a hardware environment according to one embodiment.

FIG. 8 shows a representative hardware environment associated with a user device 716 and/or server 714 of FIG. 7, in accordance with one embodiment. Such figure illustrates a typical hardware configuration of a workstation having a central processing unit 810, such as a microprocessor, and a number of other units interconnected via a system bus 812.

The workstation shown in FIG. 8 includes a Random Access Memory (RAM) 814, Read Only Memory (ROM) 816, an I/O adapter 818 for connecting peripheral devices such as disk storage units 820 to the bus 812, a user interface adapter 822 for connecting a keyboard 824, a mouse 826, a speaker 828, a microphone 832, and/or other user interface devices such as a touch screen and a digital camera (not shown) to the bus 812, communication adapter 834 for connecting the workstation to a communication network 835 (e.g., a data processing network) and a display adapter 836 for connecting the bus 812 to a display device 838.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving data from a radio frequency identification (RFID) tag;
receiving waypoint information relating to the RFID tag;
setting an ownership of a discrete portion of the data based at least in part on the waypoint information;
upon receiving additional waypoint information, setting a second ownership of a second discrete portion of the data based at least in part on the additional waypoint information, wherein at least some of the data in the second discrete portion of the data is received after receiving the additional waypoint information,
allowing an owner of one of the discrete portions of the data to view the discrete portion of the data owned by the owner, or derivative thereof; and
not allowing the owner to view discrete portions of the data that are not owned by the owner;
wherein the ownership, of the discrete portion of the data by the owner, expires after a pre-determined period of time, such that the owner is prevented from viewing the discrete portion of the data after the pre-determined period of time.

2. The method of claim 1, wherein the data is time-stamped sensor data collected by the RFID tag.

3. The method of claim 1, comprising at least one of reevaluating and expiring at least one of the ownerships in response to reaching a predefined limit on a number of owners.

4. The method of claim 1, comprising compiling the data of the one of the discrete portions into a display item selected from a group consisting of a graph and a chart, and outputting the display item to the owner of the one of the discrete portions.

5. The method of claim 1, wherein the owner of the one of the discrete portions is not allowed to alter the data owned by the owner.

6. The method of claim 1, wherein at least some of the waypoint information is based on a location of the RFID tag, wherein at least some of the discrete portions of the data are segmented according to waypoints included in the data.

7. The method of claim 1, wherein at least some of the waypoint information is based on a manual interaction of a human with the RFID tag, wherein the manual interaction is not RF-based.

8. The method of claim 1, wherein at least some of the waypoint information upon which the setting the second ownership is based relates to a change in custody of the RFID tag.

9. The method of claim 1, wherein an ownership of one of the discrete portions of the data is set upon receiving waypoint information indicating a change in custody of the RFID tag to the owner, wherein the ownership is revoked upon receiving waypoint information indicating a subsequent change in custody from the owner.

10. The method of claim 1, wherein at least some of the waypoint information is based on expiration of predefined periods of time.

11. The method of claim 1, wherein at least some of the waypoint information is based on an access to the RFID tag by an RFID reader, the waypoint information including a location of the RFID reader.

12. The method of claim 1, wherein at least some of the waypoint information is based on writing data to the RFID tag.

13. The method of claim 1, wherein at least some of the waypoint information is based on a change in sensor data collected by the RFID tag matching a predefined criterion.

14. The method of claim 1, further comprising allowing a user to manually alter at least some of the ownerships of the discrete portions of the data.

15. The method of claim 1, wherein the waypoint information includes detection of an event selected from a group consisting of: entering a password, scanning a barcode, and receiving a signature.

16. The method of claim 1, further comprising allowing a second owner of another discrete portion of the data to view the discrete portion of the data owned by the owner, or derivative thereof, as well as the another discrete portion or derivative thereof.

17. A computer program product, comprising:
executable computer code embodied on a non-transitory computer readable storage medium, the computer code including:
computer code for receiving data from a radio frequency identification (RFID) tag;
computer code for receiving waypoint information relating to the RFID tag;
computer code for setting ownerships of discrete portions of the data based at least in part on the waypoint information;
computer code for setting, upon receiving additional waypoint information, a second ownership of a second discrete portion of the data based at least in part on the additional waypoint information, wherein at least some of the data in the second discrete portion of the data is received after receiving the additional waypoint information;
computer code for allowing an owner of one of the discrete portions of the data to view the discrete portion of the data owned by the owner, or derivative thereof; and
computer code for not allowing the owner to view discrete portions of the data that are not owned by the owner;
wherein the computer code is operable such that the ownership, of the discrete portion of the data by the owner, expires after a pre-determined period of time, such that the owner is prevented from viewing the discrete portion of the data after the pre-determined period of time.

18. The computer program product of claim 17, wherein the data is sensor data collected by the RFID tag, wherein a current ownership is re-assigned at a waypoint based on the sensor data rather than changed at the waypoint.

19. The computer program product of claim 17, wherein the data is sensor data collected by the RFID tag.

20. The computer program product of claim 17, wherein at least some of the waypoint information is based on a location of the RFID tag.

21. A system, comprising:
a processor; and
memory storing logic which, when executed by the processor, causes performance of a method comprising:
receiving data from a radio frequency identification (RFID) tag;
receiving waypoint information relating to the RFID tag;
setting an ownership of a discrete portion of the data based at least in part on the waypoint information;
upon receiving additional waypoint information, setting a second ownership of a second discrete portion of the data based at least in part on the additional waypoint information, wherein at least some of the data in the second discrete portion of the data is received after receiving the additional waypoint information,
allowing an owner of one of the discrete portions of the data to view the discrete portion of the data owned by the owner, or derivative thereof; and
not allowing the owner to view discrete portions of the data that are not owned by the owner;
wherein the ownership, of the discrete portion of the data by the owner, expires after a pre-determined period of time, such that the owner is prevented from viewing the discrete portion of the data after the pre-determined period of time.

* * * * *